United States Patent [19]

Koch

[11] 4,284,198

[45] Aug. 18, 1981

[54] METHOD AND APPARATUS FOR REGULATING THE TIMING OF OPERATION OF MEANS FOR INFLUENCING CIGARETTES OR THE LIKE

[75] Inventor: Friedo Koch, Wohltorf, Fed. Rep. of Germany

[73] Assignee: Hauni-Werke Körber & Co. KG., Hamburg, Fed. Rep. of Germany

[21] Appl. No.: 9,519

[22] Filed: Feb. 5, 1979

[30] Foreign Application Priority Data

Feb. 17, 1978 [DE]  Fed. Rep. of Germany ....... 2806786
Mar. 28, 1978 [DE]  Fed. Rep. of Germany ....... 2813271

[51] Int. Cl.³ ................................................ B07C 5/34
[52] U.S. Cl. ..................................... 209/537; 209/565
[58] Field of Search ............................... 209/535–537, 209/559–566

[56] References Cited

U.S. PATENT DOCUMENTS

| | | | |
|---|---|---|---|
| 3,380,586 | 4/1968 | Frobese et al. ....................... | 209/562 |
| 3,880,750 | 4/1975 | Butler et al. ....................... | 209/564 X |
| 3,991,605 | 11/1976 | Reuland ........................... | 209/535 X |

*Primary Examiner*—Joseph J. Rolla

*Attorney, Agent, or Firm*—Peter K. Kontler

[57] ABSTRACT

Selected or successive cigarettes of a series of cigarettes which are conveyed in a making and/or processing machine are acted upon by ejecting, perforating and/or other cigarette influencing instrumentalities during travel along a selected section of their path. A pulse generating system transmits a series of timing pulses during each interval of advancement of a cigarette along a unit section of the path, and a selected timing pulse of the series of pulses is used to apply a control signal to the influencing instrumentality while the cigarette to be influenced is located in a predetermined position with respect to such instrumentality. An additional timing pulse of the same series is used to terminate the application of the control signal. The pulses which are used for application and/or termination of application of control signals can be changed in response to changing speed of the prime mover of the machine or machines. The selected and/or the additional pulses can be further utilized to effect the transport of control signals through a shift register which is interposed between the signal generating device (e.g., a testing device) and the influencing instrumentality.

19 Claims, 5 Drawing Figures

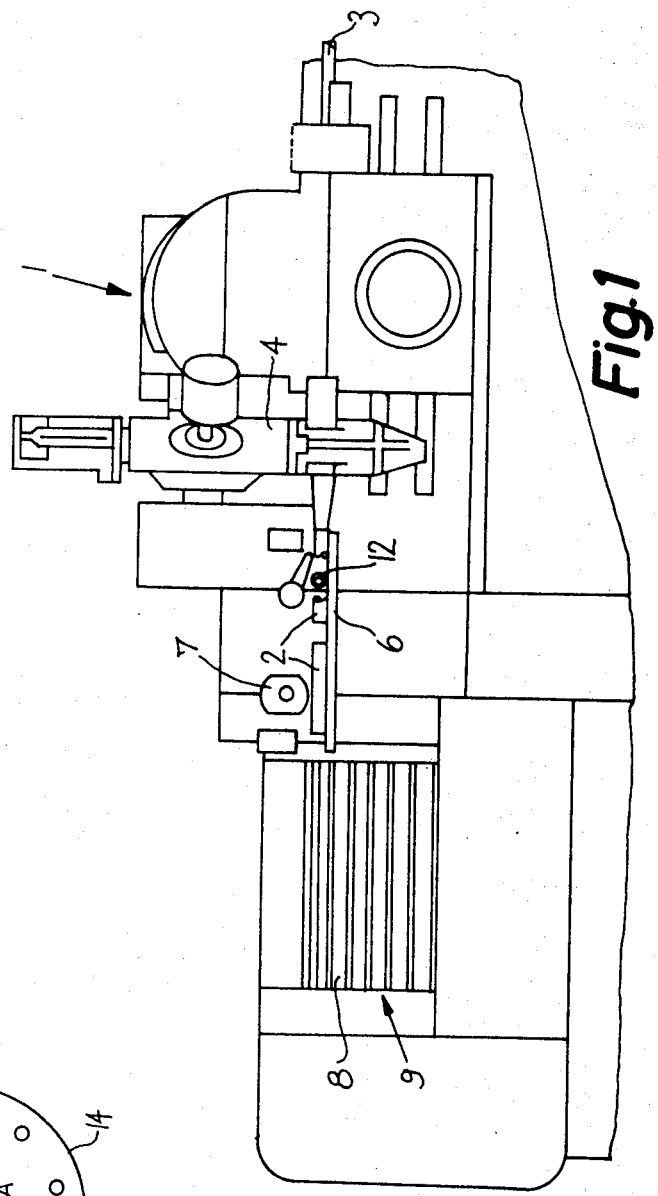
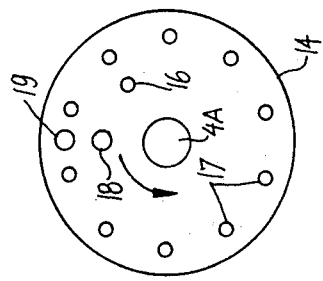

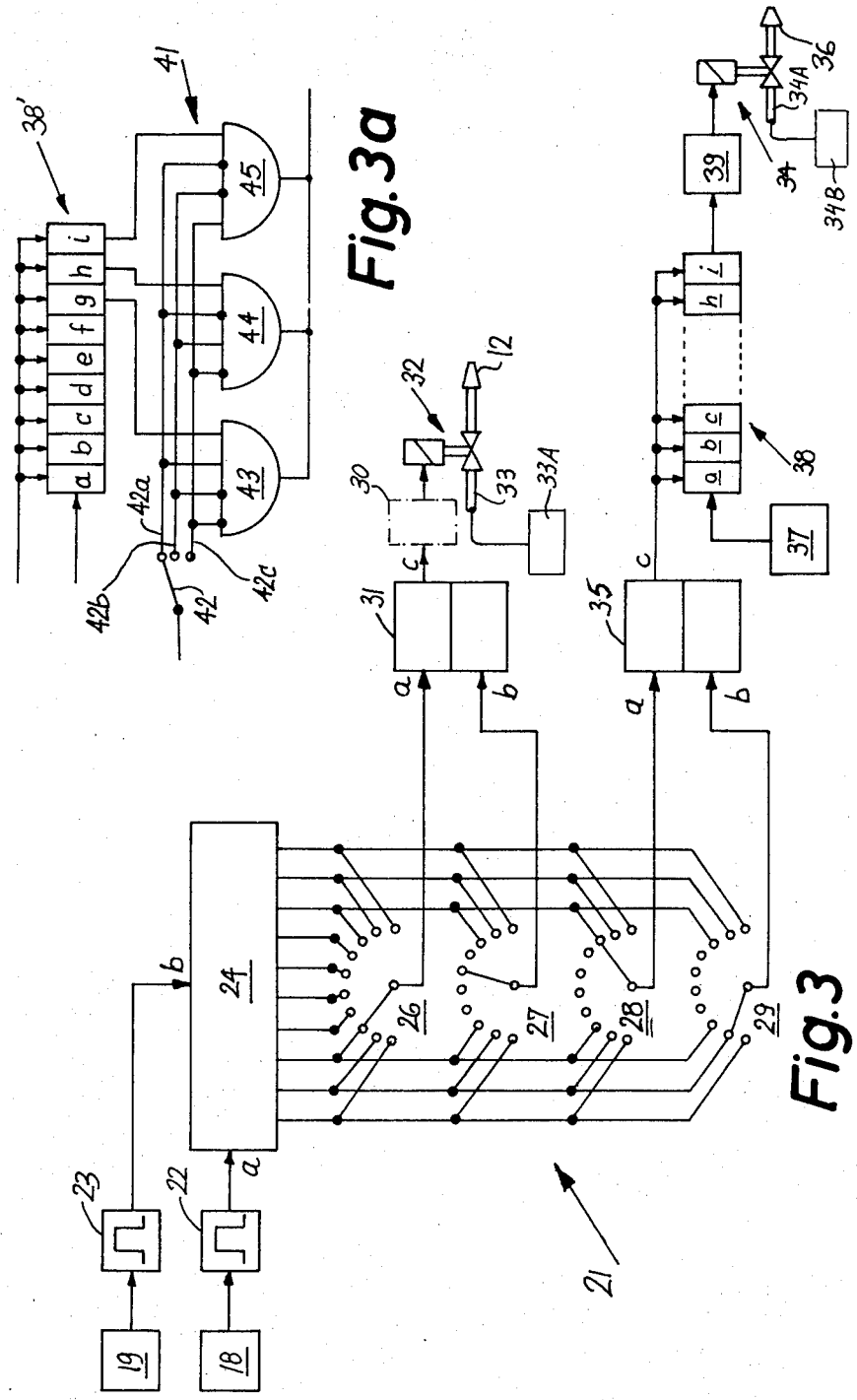

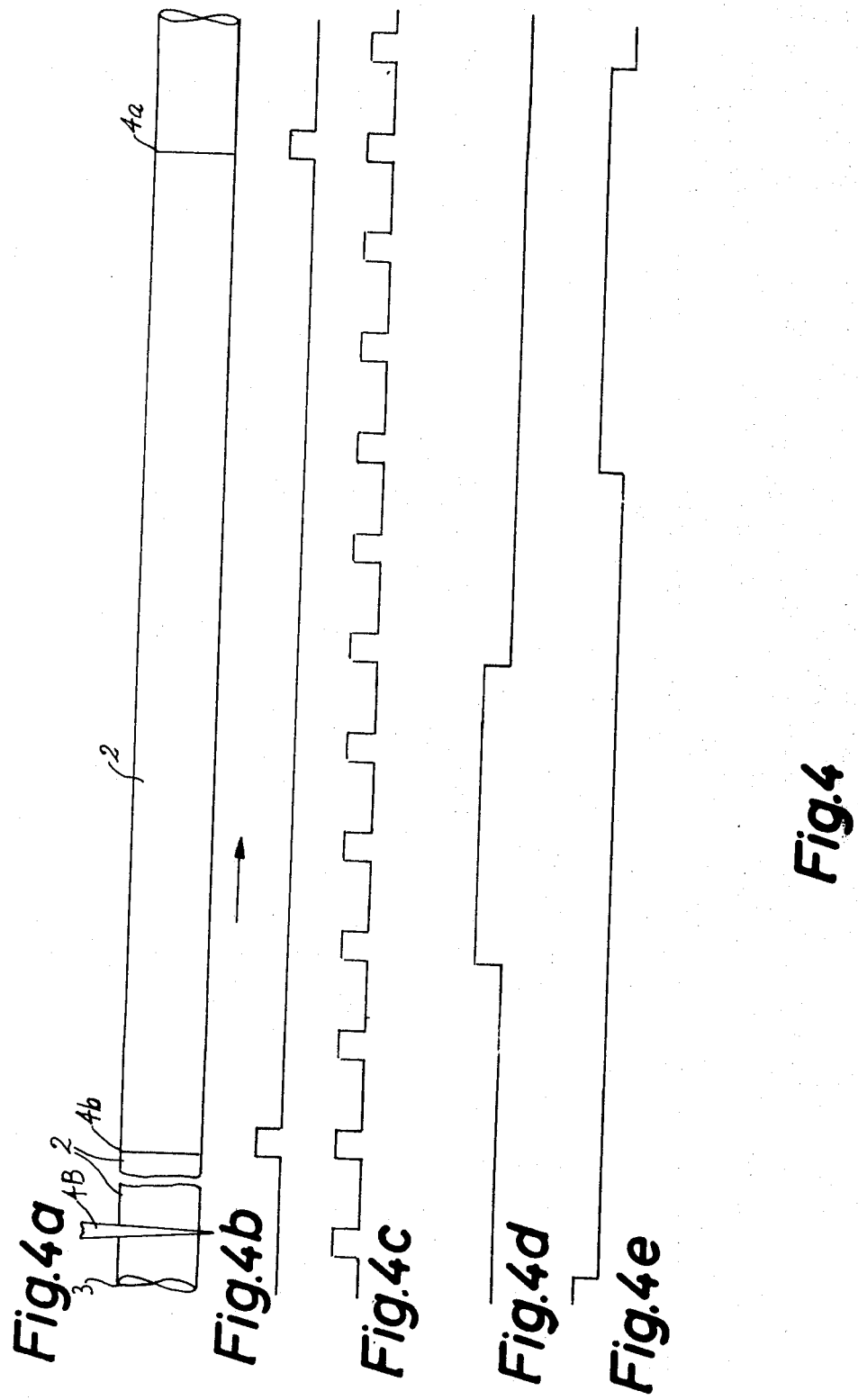

METHOD AND APPARATUS FOR REGULATING THE TIMING OF OPERATION OF MEANS FOR INFLUENCING CIGARETTES OR THE LIKE

BACKGROUND OF THE INVENTION

The present invention relates to a method and apparatus for regulating the influencing of articles which constitute, form part of or contain or include smokers' products, especially for regulating the timing of influencing of plain or filter-tipped cigarettes, cigars, cigarillos, filter rod sections or packs for smokers' products in machines for the making and/or processing of such types of articles.

Cigarettes, cigarette packs, filter plugs or other articles which form part of, constitute or contain smokers' products are normally conveyed along a predetermined path during transport in or through a making and/or processing machine. Successive articles or selected articles of a long or continuous series of such articles must be acted upon by one or more article influencing means (e.g., ejector nozzles for defective articles, perforating means for the wrappers of successive articles, shifting means for some or all of the articles, inverting means for selected articles, decelerating or accelerating means for selected or successive articles, and/or others) which are adjacent to the path of movement of articles and are responsive to control signals which are generated by detectors or the like. The timing of actuation of such influencing means is important, especially in a high-speed maker and/or processing machine which turns out and/or processes extremely large quantities of articles per unit of time. For example, a modern cigarette maker is designed to turn out up to and even in excess of one hundred cigarettes per second. Therefore, the interval of advancement of an article past an article influencing means (e.g., an ejector nozzle for defective articles) is very short, namely, in the range of a few milliseconds. As a rule, only a fraction of each such interval is available for actual influencing of an article so that the timing of the start and termination of each influencing action is of utmost importance. For example, if the length of each aforementioned interval is ten milliseconds, the duration of an influencing action must be less than ten milliseconds. If the influencing action is started too soon, it can be applied to the wrong (preceding) article. On the other hand, if the start of the influencing action is too late, such action can be felt by the article following that article which is to be influenced by a jet of compressed fluid or the like.

OBJECTS AND SUMMARY OF THE INVENTION

An object of the invention is to provide a novel and improved method of regulating the timing of action upon at least some selected cigarettes or like or analogous articles or groups of articles which are transported seriatim in rhythm with the operation of an article making and/or processing machine so that the action upon (i.e., influencing of) selected articles is not adversely influenced by eventual changes in the speed and/or by the absolute speed of advancement of the articles.

Another object of the invention is to provide a method of regulating the timing of termination of action upon at least some selected articles regardless of eventual changes in the speed of advancement of articles and/or the absolute value of such speed.

A further object of the invention is to provide a method of expelling selected articles from a series of closely adjacent or spaced apart articles which are advanced in a machine wherein the articles are produced, treated and/or assembled.

An additional object of the invention is to provide a novel and improved method of delaying the application of control signals to article influencing means in a machine wherein such signals are generated at a location ahead of the locus of action upon selected articles in response to corresponding control signals.

Another object of the invention is to provide a novel and improved apparatus for the practice of the above outlined method.

A further object of the invention is to provide an apparatus which can accurately regulate the timing and/or duration of action upon or influencing of successive or selected articles of a succession of discrete articles which advance along a predetermined path in a machine for the manufacture, processing and/or assembly (e.g., grouping) of such articles.

One feature of the invention resides in the provision of a method of regulating the timing of action upon articles which form part of, constitute or contain smokers' products and are advanced seriatim in an article making and/or processing machine along a predetermined path consisting of successive sections (each such section is bounded by a pair of neighboring articles) and extending past a station at which at least some selected articles of the succession are subjected to the action of signal-responsive article influencing means (e.g., a nozzle which discharges jets of compressed gaseous fluid to expel the selected articles from the path). The method comprises the steps of generating a succession of control signals, one for each selected article, before the respective selected articles reach the aforementioned station (the control signals can be generated by a device which tests the articles and furnishes control signals in response to detection of defective articles), generating a series of timing pulses during the interval of advancement of a selected article (or each article of the succession) along a given section of the path following the advancement of such selected article to a predetermined position immediately ahead of the given section of the path (the pulse generating means may comprise one or more proximity detectors serving to furnish a predetermined number of timing pulses during each interval which elapses while an article advances along a section of the path), and utilizing a selected one of the series of timing pulses for the application of a control signal to the influencing means when the corresponding selected article advances past the aforementioned station. The means for utilizing selected pulses of the series of timing pulses for the application of a control signal may comprise a selector circuit having an adjustable counter for the series of timing pulses and means for causing the application of a control signal when the counter receives a given number of timing pulses.

The method may further comprise the step of utilizing the selected pulses for transport (delaying) of control signals in imitation of advancement of the corresponding selected articles toward the station for the article influencing means. The control signals can be transported by a shift register whose first stage is connected with the means for generating control signals and an additional stage of which is connected or connectable to the influencing means.

Still further, the method preferably comprises the step of utilizing an additional pulse of the series of timing pulses for termination of the application of the corresponding control signal to the article influencing means. Such additional pulse can also be used for transport (delaying) of the control signal in imitation of advancement of the corresponding selected article toward the article influencing means.

The step of subjecting the selected articles to the action of article influencing means when the latter receives a control signal may include expelling such selected articles from the path.

The method may further comprise the steps of varying or changing the speed at which the articles advance along the path and selecting different pulses of the series of timing pulses for the application of a control signal at different speeds of advancement of articles along the path. The last mentioned step preferably includes selecting an earlier generated pulse of the series when the speed of advancement of articles increases and vice versa.

Analogously, the method may include the step of selecting a different additional pulse of the series of timing pulses for termination of application of the corresponding control signal at different speeds of advancement of articles along the path, preferably in such a way that an earlier generated additional pulse is selected when the speed of advancement of articles increases and vice versa.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary elevational view of a cigarette making machine which is equipped with an apparatus embodying the invention;

FIG. 2 illustrates a detail of the apparatus;

FIGS. 3 and 3a are circuit diagrams of the apparatus;

FIGS. 4a–e are pulse and control signal diagrams; and

DESCRIPTION OF THE PREFERRED EMBODIMENTS

Figure 5:
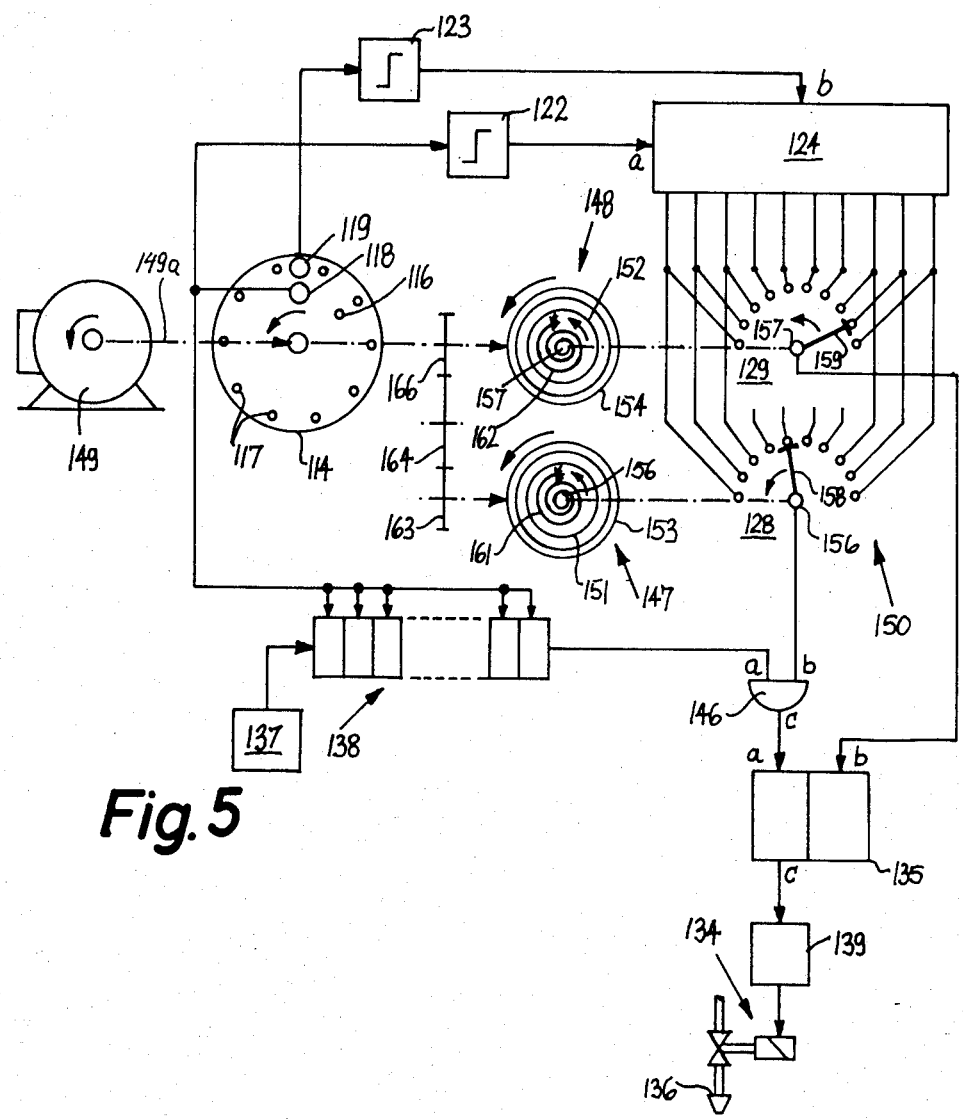
FIG. 5 is a circuit diagram of a modified apparatus.

FIG. 1 shows a portion of a maker 1, i.e., a machine which turns out a continuous rod-shaped product prior to subdivision of such product into discrete portions or articles 2 of desired (unit or multiple unit) length. The articles 2 may constitute plain cigarettes, cigars or cigarillos, or filter rod sections. In the illustrated embodiment, the maker 1 is a cigarette making machine which produces plain cigarettes 2 of unit length. Such cigarettes can be advanced to storage, directly to a packing machine or to a filter tipping machine, e.g., a machine of the type known as MAX S produced by the assignee of the present application. Regardless of the exact nature of the machine 1, it invariably comprises means for forming a continuous filler of tobacco or filter material, means for wrapping the filler into a web of cigarette paper or the like so that the filler and the web therearound constitute a continuous wrapped filler rod or cigarette rod 3, and a cutoff 4 which severs the rod 3 at regular intervals so that the rod yields a single file of discrete articles 2. A maker of similar construction is disclosed in U.S. Pat. No. 4,037,608 (granted July 26, 1977 to Wahle) to which reference may be had if necessary, for example, for details of the mechanism which drapes the web around the filler and provides the resulting tubular envelope with a longitudinally extending seam. In the manufacture of certain filter rod sections, the filler need not be provided with a discrete wrapper, i.e., the outermost layer of the filler can constitute a tubular envelope.

The articles 2 which are severed from the leading end of the rod 3 by the orbiting cutter or cutters 4B (see FIG. 4) of the cutoff 4 advance in an elongated guide channel 6 whose upper side is open, and successive articles of the single file or succession of articles are engaged and propelled forwardly (in a direction to the left, as viewed in FIG. 1) by a rapidly rotating accelerating cam 7 which increases the spacing between successive articles 2 and causes successive articles or successive pairs of articles to enter successive axially parallel peripheral flutes 8 of a rotating drum-shaped row forming conveyor 9 serving to convert the single file of articles into one or more rows wherein the articles advance sideways. Such articles can be advanced into trays, into the magazine of a packing machine, to the assembly conveyor of a filter tipping machine or to a pneumatic sender (especially in the case of filter rod sections) which propels the articles into the magazine of a filter tipping machine.

The path along which the articles 2 advance in the machine 1 and in the next-following machine or machines (e.g., in a filter tipping machine if the machine 1 is a maker of plain cigarettes, cigars or cigarillos) can be said to consist of a plurality of successive path sections each of which is flanked by two neighboring (successive) articles 2. As explained above, the articles 2 of the single file are immediately adjacent to each other during travel between the severing station (cutoff 4) and the accelerating station (cam 7). Once they advance beyond the cam 7, the articles 2 are spaced apart from each other, namely, axially during travel between the cam 7 and their positions of rest in the respective flutes 8 and thereupon laterally during sidewise advancement with the flutes 8. As a rule, the articles 2 which enter the filter tipping machine (e.g., a machine disclosed in commonly owned U.S. Pat. No. 3,957,156 granted May 18, 1976 to Schwenke to which reference may be had, if necessary), advance only sideways with intermittent axial movements, e.g., during axial shifting into abutment with the end faces of filter plugs. Once the articles 2 are spaced apart from each other, each section of the aforementioned path includes that part of the path wherein an article 2 must move from its preceding position to occupy the position previously occupied by the preceding article, it being assumed here that one refers to a predetermined initial or starting position. For example, a section of the path which is defined by the conveyor 9 includes that portion of the path of a flute 8 along which such flute must advance in order to reach, after the conveyor 9 is started, the position previously occupied by the immediately preceding flute.

While the articles 2 are advanced, either in the maker 1 or in the next-following processing machine or machines, such as the aforementioned filter tipping machine, some or all of them are subjected to one or more treatments or actions at certain stations which are adjacent to the aforediscussed path. Such treatments are carried out by diverse instrumentalities which can be broadly called article influencing or processing means and many of which can properly influence the articles only if the timing of their action upon successive or selected articles in the path is chosen with utmost precision. The importance of accurate timing will be readily appreciated if one bears in mind that a modern maker of plain cigarettes turns out up to and even in excess of one hundred plain cigarettes per second. Thus, the intervals which elapse during travel of an article past an influencing means are extremely short, especially if the articles are moved sideways. FIG. 1 shows an influencing means including a nozzle 12 which discharges streamlets or jets of compressed air or another suitable gaseous fluid whenever a defective article 2 advances therealong. This nozzle is installed in the machine 1 between the cutoff 4 and the accelerating cam 7 and should discharge a jet of compressed gas at the exact moment when the central portion (as measured in the longitudinal direction of the articles) of a defective article 2 is adjacent to its orifice. Otherwise, the article which is acted upon by the jet of compressed air or another gaseous fluid is likely to exert adverse influence upon the orientation of neighboring (presumably or normally satisfactory) articles in the path portion which is defined by the guide channel 6. It goes without saying that the nozzle 12 can be installed next to the conveyor 9 or in the processing machine which receives articles from the making machine 1. In such instances, jets of compressed fluid which issue from the orifice of the nozzle 12 expel articles which move sideways.

Another influencing means is a perforating unit, e.g., a perforating unit which operates with one or more laser beams and is used to provide the wrappers of successive rod-shaped articles with holes in order to permit a predetermined quantity of atmospheric air to enter the column of tobacco smoke. Such perforating units are used in many types of machines for the production of rod-shaped smokers' products, e.g., to make holes in the filter plugs prior or subsequent to attachment of filter plugs to plain cigarettes, cigars or cigarillos. Cigarettes which have holes for admission of atmospheric air are known as light cigarettes. The admission of atmospheric air influences the quantity of nicotine, condensate and/or other deleterious ingredients in tobacco smoke. Perforating units which can be used in the machine 1 or in a machine which receives articles 2 from the machine 1 are disclosed in commonly owned copending applications Ser. Nos. 841,108 (now U.S. Pat. No. 4,193,409 granted Mar. 18, 1980) and 864,441 respectively filed October 11, 1977 and December 27, 1977 by Wahle et al. and Lüders et al.

Referring to FIG. 3, the nozzle 12 is connected to a source 33A of compressed gaseous fluid by a conduit 33 which contains a normally closed solenoid operated valve 32. The solenoid of the valve 32 must be energized (i.e., the influencing means including the nozzle 12 and valve 32 must be actuated) at the exact moment when the center of a defective article 2 is adjacent to the orifice of the nozzle 12. Defective articles 2 are spotted in the customary way, e.g., by a testing device 37 having means for monitoring the condition of wrappers and/or certain other characteristics of successive articles 2. The control signal which is produced by the testing device 37 must be transmitted to the solenoid of the valve 32 at the exact instant when the detected defective article 2 completes its travel from the testing station into the range of the nozzle 12. Certain reasons for the need of accurate timing of the action of influencing means have been explained above. An additional reason is that, in the absence of accurate timing, the jets of compressed gaseous fluid which issue from the orifice of the nozzle 12 are likely to cause expulsion of acceptable (satisfactory) articles 2 or will act upon a defective article in such a way that the latter does not leave the path along which only satisfactory articles are supposed to advance to the next station or into the next machine. The presence of defective articles in packs or other types of containers for cigarettes, cigars or cigarillos is objectionable for obvious reasons. Furthermore, a packing machine is likely to have a further detector which monitors the articles prior or subsequent to introduction of a group or array of articles into a pack whereby the detection of a single defective article in a group of say twenty properly arrayed cigarettes entails the ejection of the entire group, i.e., the number of satisfactory articles which must be expelled from the production line as a result of untimely segregation or lack of segregation of a single defective article is very high.

Accurate timing of activation of intermittently operated influencing means in cigarette making machines and related or associated machines creates ever increasing problems because the speed and hence the output of such machines increases practically from year to year. Moreover, and especially as regards certain types of rod-shaped smokers' products, the requirements of manufacturers regarding the quality of products as well as the rules enforced by authorities in charge of regulating the tobacco industry are becoming more and more stringent so that a high degree of accuracy in timing the operation of influencing means (such as ejectors of defective articles) is a necessary prerequisite for acceptability of a maker or of a tobacco processing machine to the manufacturers of cigarettes or other rod-shaped smokers' products. Presently known influencing means, or at least many types of influencing means, are incapable of meeting the just discussed requirements in the manufacture and/or processing of smokers' products at a rate of or close to one hundred per second. In many presently known machines wherein defective rod-shaped smokers' products must be segregated from other products at a particular location, the control signal which denotes the detection of a defective article is transported to an ejecting device in imitation of the transport of the respective (defective) article from the testing station to the ejecting station. Typical examples of such means for transporting (delaying) signals in imitation of transport of articles whose monitoring has caused the generation of signals are shift registers whose stages receive signal transporting pulses from a pulse generator which transmits pulses at a frequency proportional to the momentary speed of the respective machine. Such shift registers can be used in the apparatus of the present invention, provided that the timing of transmission of a "detect" signal or other control signal to the first stage or a selected stage is sufficiently accurate to satisfy the aforediscussed requirements.

In accordance with a feature of the invention, the rotary component (shaft) 4A of the cutoff 4 carries a disk 14 which is shown in FIG. 2. The shaft 4A is assumed to complete one revolution between two successive cutting or severing actions of the device 4. A magnet, a cam or another suitable pulse generation initiating element 16 on the disk 14 travels past a first proximity detector 18 so that the latter generates a pulse in response to each revolution of the shaft 4A, i.e., in response to each severing action of the cutoff 4. The element 16 is inwardly adjacent to an annulus of ten equally spaced pulse generation initiating elements 17 (e.g., magnets) which travel seriatim past a second proximity detector 19 so that the latter generates ten timing pulses during each revolution of the disk 14. The position of the proximity detector 18 and/or element 16 is selected in such a way that the detector 18 generates and transmits a pulse prior to actual severing of an article 2 from the leader of the wrapped filler rod 3 but after the leader of the rod 3 has advanced beyond the cutting plane, namely, when the foremost end of the rod is located at the rearmost point of the first section of the aforementioned path. Thus, the timing of successive pulses which are generated by the detector 18 is such that each pulse is generated when the foremost part of the leader of the wrapped rod 3 is in a predetermined position, namely, when the foremost part of the leader is about to enter the foremost (immediately following) section of the path for the articles 2. Each such section of the path contains one article at a time, i.e., an article is always located in the range of the ejector nozzle 12; however, the latter is to emit a jet of compressed gaseous fluid only when it can direct such jet against a defective article 2, i.e., when a control signal (generated for example by the testing device 37) is applied thereto.

FIG. 3 shows a selector circuit 21 which receives pulses from the proximity detectors 18 and 19 via pulse shapers 22 and 23, respectively. The selector circuit 21 comprises an adjustable counter 24 whose input b receives driving pulses from the detector 19 and whose input a receives resetting pulses from the detector 18. The means for adjusting the circuit 21 comprises switches 26, 27, 28 and 29.

The first adjusting switch 26 which is shown in the "2" position serves for selection of the driving pulses supplied by the detector 19 and determines the start of application of the control signal. The movable contact of the switch 26 transmits pulses to the setting input a of a signal storing circuit or storage 31.

The second adjusting switch 27 is shown in the "5" position and serves to select that driving pulse from the detector 19 which terminates the transmission of a control signal. The movable contact of the switch 27 is connected with the erasing input b of the signal storing circuit 31. The output c transmits the control signal to the solenoid of the valve 32 during the interval which elapses between the transmission of a pulse to the setting input a and the transmission of a pulse to the erasing input b of the circuit 31. The start of transmission of a control signal to the solenoid of the valve 32 is delayed because the switch 26 transmits the selected start pulse in response to transmission of the second pulse from the detector 19 subsequent to transmission of a pulse to the resetting input a of the counter 24. If the nozzle 12 is located immediately downstream of the cutoff 4 (as considered in the direction of travel of articles 2 toward the accelerating cam 7 of FIG. 1), the valve 32 will open to permit a jet of compressed gas to expel a defective article with a short delay, namely, a delay which is required by an article 2 to cover a distance corresponding to two tenths of the length of a path section. In other words, and as already outlined above, the jet will impinge upon a defective article 2 subsequent to transmission of a reset pulse to the input a of the counter 24, namely, with a delay which is required by the detector 19 to transmit two driving pulses to the input b of the counter 24.

Energization of the solenoid which forms part of the valve 32 is terminated in response to transmission of an additional driving pulse from the switch 27 to the erasing input b of the signal storing circuit 31; such pulse causes the output c of the circuit 31 to cease the transmission of a control signal to the solenoid. In the illustrated embodiment, the setting of the switch 27 is such that the duration of a control signal equals the combined duration of three intervals between the transmission of two successive driving pulses to the input b of the counter 24. Thus, the valve 32 will close when the (selected) article 2 in question has advanced by a distance corresponding to five tenths of the length of a section of the aforementioned path. It will be seen that the setting of the adjusting switch 26 determines the start and the setting of the adjusting switch 27 determines the end of transmission of a control signal. It will also be seen that the adjusting switches 26 and 27 enable the attendant to select, practically at will, that part of a section of the path for articles 2 during which the valve 32 will direct a jet of compressed gas against the adjacent (selected) article. The attendant can select the duration of the control signal as well as the timing of the start of such control signal subsequent to transmission of a resetting pulse to the input a of the counter 24. This enables the attendant to insure that a defective article is influenced by the nozzle when it assumes a preselected position with respect to the orifice of the nozzle 12 as well as that the nozzle will discharge a jet of compressed gas for an interval of time which is sufficient to insure reliable expulsion of a defective article. A circuit which initiates and regulates the expulsion of certain articles is disclosed in commonly owned U.S. Pat. No. 4,004,593 to Kaeding et al. This circuit is shown schematically in FIG. 3, as at 30, and is installed between the storage 31 and solenoid of the valve 32. In FIG. 2 of the patent to Kaeding et al., the solenoid of the valve is energized by a multivibrator which is connected with a pulse generator. Such multivibrator is replaced by the storage 31 and the selector circuit 21 of FIG. 3. The output c of the storage 31 transmits a control signal only under certain circumstances, e.g., during starting and acceleration, prior to actual stoppage and/or in response to signals which are generated by one or more testing devices.

As mentioned above, the nozzle 12 constitutes but one of many means which can influence the articles 2 in the maker 1 or in a machine which is installed downstream of the maker. A typical example of another suitable influencing means in the aforediscussed perforating unit which employs sets of needles, one or more laser beams, spark generating electrodes or other means for burning or otherwise making holes in the wrappers of successive articles 2 or of articles or groups of articles of which the articles 2 constitute component parts.

The counter 24 is reset to zero by the detector 18, i.e., once during each revolution of the disk 14. To this end, the detector 18 transmits a pulse to the input a of the counter 24 via pulse shaper 22.

The selector circuit 21 of FIG. 3 further comprises a third adjusting switch 28 whose movable contact can transmit a pulse to the setting input a of a second signal storing circuit 35, and a fourth adjusting switch 29 whose movable contact can transmit a pulse to the erasing input b of the circuit 35. The output c of the circuit 35 transmits pulses to the stages a, b, c . . . h, i of a shift register 38. The first stage a is connected with the testing device or signal generator 37, and the last stage i is connected with an amplifier 39 for the solenoid of a valve 34 in a conduit 34A serving to supply compressed gaseous fluid to the orifice of a second article influencing nozzle 36. The source 34B of compressed fluid may be a discrete source or it may be identical with the aforementioned source 33A. The interval which elapses between the transmission of a pulse to the input b and the following transmission of a pulse to the input a of the circuit 35 determines the delay with which a control signal transmitted by 37 to the first stage a is stored in the stage a. The relative positions of movable contacts of the adjusting switches 28 and 29 indicate that the interval which elapses between the transmission of successive pulses to the inputs a and b of the storing circuit 35 can overlap with the travel of an article from a preceding section into the next-following section of its path. Otherwise stated, one of these pulses is generated while the article is in the process of completing its movement into a first section of the path and the other of these pulses is generated after completion of such movement, i.e., while the article is in the process of moving toward its final position in the next section of the path.

The purpose of the switches 28 and 29 is to determine the timing of influencing of some or all of the articles at a location which is more distant from the disk 14, e.g., at a location in the filter tipping machine which receives articles 2 (plain cigarettes) from the maker 1 of FIG. 1. The signal generator 37 of FIG. 3 can constitute or include the transducer of a testing device which monitors filter cigarettes of unit length or multiple unit length in the filter tipping machine and generates control signals in response to detection of defective articles. The "defect" signals which are transmitted by the transducer of 37 are analogous to the aforementioned control signals and the purpose of the shift register 38 is to delay the transmission of such defect signals to the solenoid of the valve 34 until the corresponding defective articles move into the range of compressed fluid which issues from the orifice of the nozzle 36 when the valve 34 opens. The pulses which are transmitted by the output c of the signal storing circuit 35 at intervals depending on the setting of the switches 28 and 29 are the so-called transporting pulses which advance the control signal from 37 from stage to stage of the shift register 38. The selector circuit 21 delays the advancing pulses with respect to the rate of output of the maker 1 (as denoted by the frequency of pulses transmitted by the detector 18).

The aforedescribed construction insures that the shifting of delaying pulses remains unchanged irrespective of the speed of the maker 1, i.e., the amplifier 39 amplifies the delayed defect signal at the exact moment when the article 2 which has caused the device 37 to generate a defect signal is in an optimum position with respect to the orifice of the nozzle 36 regardless of whether the speed of the maker 1 is high or low. As mentioned above, control signals which are furnished by the device 37 denote the detection of defective articles which may be the articles 2 or modified articles including portions of or the entire articles 2.

It is also within the purview of the invention to transmit to the shirt register stages pulses which coincide in time with pulses denoting the rate of operation of the maker 1 and to shift the control or defect signals (e.g., those transmitted by the testing device 37) when the defect signal which is transmitted by the shift register 38 reaches the circuit component downstream of the shift register. This would be tantamount to utilizing the selector circuit 21 and the storing circuit 35 between the last stage i of the shift register 38 and the amplifier 39 (see FIG. 5).

It is further within the spirit of the invention to vary the number of effective stages of the shift register (see the shift register 38' of FIG. 3a). This is desirable or necessary when the length of articles 2 is not constant, namely, when the combined length of two shortest articles deviates from the sum of lengths of two longest articles by more than the length of an article. In the absence of adjustment of the number of effective stages in the shift register 38', it could happen that a control signal reaches the influencing means when the article which precedes or follows the defective article reaches the orifice of the nozzle 12 or 36. The circuit of FIG. 3a comprises a second or auxiliary selector circuit 41 with an auxiliary adjusting switch 42 and a blocking or locking unit including three AND-gates 43, 44 and 45. The circuit of FIG. 3a can select any one of three (last or additional) stages g, h, i of the shift register 38' for transmission of a control signal to the next component, e.g., to the amplifier 39 of FIG. 3. In other words, and depending on the position of the movable contact of the auxiliary adjusting switch 42, the control signal which is transmitted to the first stage a of the shift register 38' can leave the shift register after it reaches the selected additional stage g, h or i. In the illustrated position of movable contact of the switch 42, the control signal leaves the shift register 38' when it reaches the additional stage g. This is due to the fact that the gates 44 and 45 are inactive, i.e., the control signal can leave the system of FIG. 3a only via output of the AND-gate 43. The output of the AND-gate 43 transmits a signal when its two right-hand inputs receive signals from the conductor 42a and from the stage g of the shift register 38'. The output of the AND-gate 44 transmits a signal when this gate receives signals from the conductor 42b and from the stage h of the shift register 38', and the output of the gate 45 transmits a signal when this gate receives signals via conductor 43c and from the stage i of the shift register 38'. It will be seen that, by the simple expedient of providing the auxiliary selector circuit 41, the amplifier 39 of FIG. 3 can receive control signals from the selected additional stage g, h, or i of the shift register 38'. This, in turn, renders it possible to alter the interval of delay of transmission of a control signal in accordance with variations of the length of articles 2.

FIG. 4 (composed of FIGS. 4a to 4e) shows the mode of generating control signals which are transported in imitation of advancement of an article 2 which is severed from a wrapped filler 3 by the knife of knives 4B of the cutoff 4 shown in FIG. 1. The two cutting planes wherein the wrapped rod 3 is severed to yield the article 2 are shown at 4a and 4b (see FIG. 4a). FIG. 4b illustrates the pulses which are generated by the proximity detector 18, and FIG. 4c shows the series of pulses generated by the proximity detector 19. It will be noted that the detector 19 generates a series of ten pulses per article 2. FIG. 4d shows the start and termination of a control signal as determined by setting of the adjusting switches 26, 27 in the selector circuit 21 of FIG. 3. FIG. 4e shows the control signal which is selected by the adjusting switches 28 and 29; it will be noted that this signal persists while the rod 3 is severed by the knife 4B at the location 4a.

In the apparatus of FIG. 5, all such parts which are identical with or clearly analogous to corresponding parts of the apparatus of FIG. 3 are denoted by similar reference characters plus 100. In this apparatus, all stages of the shift register 138 receive signal transporting pulses at a frequency which coincides with the rhythm of operation of the machine. As shown, the stages of the shift register 138 are connected with the output of the proximity detector 118. The timing of application of a control signal from the signal generator 137 is effected by a selector circuit 150. To this end, the last stage of the shift register 138 and the movable contact of the adjusting switch 128 are connected to the corresponding inputs a and b of an AND-gate 146. The output c of the AND-gate 146 is connected with the setting input a of a signal storing circuit 135 which output c is connected with an amplifier 139 for the solenoid of a valve 134 for the ejector 136. The erasing input b of the signal storing circuit 135 is connected with the movable contact of the adjusting switch 129.

The adjusting switches 128, 129 are respectively connected with eddy current clutches 147, 148 which react to changes in RPM. The rotors (magnets) 151, 152 of the respective clutches 147, 148 are connected with the output element 149a of the variable-speed main prime mover 149 for the machine or machines which make and/or process the articles. The clutches 147, 148 further respectively comprise aluminum rings 153 and 154 which are connected with shafts 156, 157 for sliding contacts 158, 159 of the adjusting switches 128, 129. The shafts 156, 157 further respectively carry calibrated torsion springs 161, 162 which oppose rotation of the aluminum rings 153, 154 by the magnetic fields of the respective rotors 151, 152. The design of the clutches is similar to that of tachometer generators for use in automotive vehicles or the like. The clutches 147, 148 are kinematically connected to each other by a gear train including the gears 163, 164 and 166.

In the apparatus of FIG. 5, control signals which are transmitted by the transducer of the testing device or signal generator 137 are delayed, at first, in synchronism with the rhythm of operation of the machine, but independently of the machine speed, by way of the shift register 138. However, the transmission of a control signal from the last stage of the shift register 138 to the input a of the signal storing circuit 135 is determined by the adjusting switch 128 of the counter 124. The switch 128 insures that the control signal is transmitted to the amplifier 139 in dependency on the machine speed in the course of the corresponding cycle. Thus, as the speed of the output element 149a of the main prime mover 149 increases, together with the speed of means for advancing the articles (the advancing means receives motion from the variable-speed prime mover 149), the sliding contact 148 is rotated counterclockwise by the respective clutch 147 so as to reduce that number of pulses transmitted to the input b of the counter 124 before the input b of the AND-gate 146 receives a pulse. Thus, as the speed of the main prime mover 149 increases, the output c of the signal storing circuit 135 begins to transmit the control signal from the signal generator 137 and shift register 138 at an earlier stage of the respective machine cycle. Inversely, the transmission of a control signal to the amplifier 139 within a cycle is delayed when the speed of the prime mover 149 increases. Since the switch 129 is also adjusted in dependency on the speed of the prime mover 149 (namely, by the clutch 148), deenergization of the solenoid of the valve 134 also takes place in dependency on the RPM of the output element 149a. If desired (or at least under certain circumstances), both adjusting switches 128, 129 can be regulated by a single eddy current clutch, i.e., the sliding contacts of both adjusting switches can be mounted on the shaft 157 or 158.

It will be noted that, by appropriate adjustment of the starting or initial positions of sliding contacts 158, 159 of the adjusting switches 128, 129, the optimum timing of influencing of the articles (not shown in FIG. 5) can be achieved irrespective of changes of RPM of the output element 149a by automatically conforming the start and termination of application of control signals (i.e., of opening and closing of the valve 134) to changes of the speed of the prime mover. In the embodiment of FIG. 5, adjustment of the switch 128 need not be identical with adjustment of the switch 129; this will be readily appreciated since the adjustment of sliding contact 158 in response to a change of RPM of the output element 149a need not be the same as the adjustment of sliding contact 159 if the calibration of torsion springs 161 and 162 is not identical.

A further mode of adjusting the switches 128, 129 in dependency on changes of RPM of the output element 149a can be achieved by resorting to purely electronic means. For example, one can resort to a counter followed by threshold circuits which are locked with respect to each other. Still further, a conformance to different speeds of the machine (i.e., of the prime mover which transmits torque or other type of motion to various components of the maker and/or of the machine or machines which are directly or indirectly coupled with the maker) can be achieved by regulating the phase position or frequency of an advancing pulse with respect to the machine cycle.

The apparatus of FIG. 5 it utilized when the variations of speed of the prime mover 149, and hence the variations of speed of means (such as the conveyor 8) for advancing the articles along their path, are very pronounced. In such instances, it would be difficult to achieve accurate timing of activation and deactivation of the influencing means by resorting to one and the same selected or additional pulse of the series of pulses which are generated by the proximity detector 19 or 119. The clutches 147 and 148 insure that the selected and additional pulses of a series of timing pulses are changed automatically (i.e., that an earlier or later generated pulse is used for starting and terminating the influencing action) when the speed of the prime mover 149 is changed for any one of a variety of reasons. For example, many cigarette makers can be operated at two or more different speeds including a lower speed immediately after starting or during splicing of successive cigarette paper webs to each other, and a higher speed during normal operation of the machine.

An important advantage of the improved method and apparatus is that the action of influencing means upon successive or selected articles of the series or succession of articles which are advanced through one or more making, processing and/or assembling machines is invariably satisfactory, even when the speed of transport is extremely high as well as when the speed varies within a wide range and/or when the length of articles of such series is not uniform. The timing of utilization of selected pulses for starting the action of influencing means and of additional pulses of the same series for termination of the influencing action can be selected with a high degree of accuracy even if the inertia of the influencing means is rather high.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A method of regulating the timing of action upon articles which form part of, constitute or contain smokers' products and are advanced seriatim in a making and/or processing machine along a predetermined path consisting of successive sections, each bounded by a pair of neighboring articles and each including that part of said path along which an article must move from its preceding position to occupy the position previously occupied by the adjacent article in the direction of advancement, and extending past a station at which at least some selected articles of said succession are subjected to the action of signal-responsive influencing means, comprising the steps of generating a succession of control signals, one for each of said selected articles, before the respective selected articles reach said station; generating a series of n timing pulses during the interval of advancement of a selected article along a given section of said path following the advancement of such selected article to a predetermined position immediately ahead of said given section, each selected article advancing through a distance equaling d/n, wherein d is the length of said given section, during each interval between the generation of two successive timing pulses; and utilizing a selected one of said series of timing pulses for the application of a control signal to the influencing means when the corresponding selected article advances past said station.

2. The method of claim 1, further comprising the step of utilizing said selected pulses for transport of said control signals in imitation of the advancement of corresponding selected articles toward said station.

3. The method of claim 1, wherein said utilizing step includes counting the pulses of said series of timing pulses.

4. The method of claim 1, wherein said step of subjecting said selected articles to the action of influencing means includes expelling such selected articles from said path.

5. Apparatus for regulating the timing of action upon articles which form part of, constitute or contain smokers' products, comprising means for advancing a succession of articles in a making and/or processing machine along a predetermined path consisting of successive sections each bounded by a pair of neighboring articles and each including that part of said path along which an article must move from its preceding position to occupy the position previously occupied by the adjacent article in the direction of advancement; signal-responsive article influencing means adjacent to one of said sections; means for generating control signals for at least some selected articles of said succession while such articles advance along a portion of said path ahead of said influencing means; means for generating a series of n timing pulses during each interval of advancement of a selected article along a given section following the advancement of such selected article to a predetermined position immediately ahead of said given section, said advancing means being operative to move a selected article through a distance d/n, wherein d is the length of said given section, during each interval between the generation of two successive timing pulses; and selector means including means for applying said control signals to said influencing means in response to the generation of a selected one of said series of timing pulses while the respective selected article advances along said one section of said path.

6. The apparatus of claim 5, wherein said selector means comprises an adjustable pulse counter.

7. The apparatus of claim 5, further comprising a shift register having a first stage connected with said signal generating means and a plurality of additional stages each connectable with said influencing means, means for connecting a selected one of said additional stages to said influencing means, and means for transmitting said selected pulses to said stages to thereby effect the transport of control signals from said first stage to said selected additional stage.

8. The apparatus of claim 5, wherein said influencing means comprises means for expelling said selected articles from said path.

9. The apparatus of claim 5, further comprising means for transporting said control signals in imitation of advancement of the respective selected articles along said path toward said influencing means.

10. The apparatus of claim 9, wherein said transporting means comprises a shift register having a plurality of stages including a first stage connected to said signal generating means and an additional stage connected to said influencing means, and further comprising means for transmitting said selected pulses to said stages to thereby effect the transport of control signals from said first to said additional stage.

11. A method of regulating the timing of action upon articles which form part of, constitute or contain smokers' products and are advanced seriatim in a making and/or processing machine along a predetermined path consisting of successive sections, each bounded by a pair of neighboring articles, and extending past a station at which at least some selected articles of said succession are subjected to the action of signal-responsive influencing means, comprising the steps of generating a succession of control signals, one for each of said selected articles, before the respective selected articles reach said station; generating a series of timing pulses during the interval of advancement of a selected article along a given section of said path following the advancement of such selected article to a predetermined position immediately ahead of said given section; utilizing a selected one of said series of timing pulses for the application of a control signal to the influencing means when the corresponding selected article advances past said station; and utilizing an additional pulse of said series of timing pulses for termination of the application of the corresponding control signal to the influencing means.

12. The method of claim 11, further comprising the step of utilizing said additional pulse of said series of pulses for transport of said control signals in imitation of the advancement of corresponding selected articles toward said station.

13. A method of regulating the timing of action upon articles which form part of, constitute or contain smokers' products and are advanced seriatim in a making and/or processing machine along a predetermined path consisting of successive sections, each bounded by a pair of neighboring articles, and extending past a station at which at least some selected articles of said succession are subjected to the action of signal-responsive influencing means, comprising the steps of generating a succession of control signals, one for each of said selected articles, before the respective selected articles reach said station; generating a series of timing pulses during the interval of advancement of a selected article along a given section of said path following the advancement of such selected article to a predetermined position immediately ahead of said given section; utilizing a selected one of said series of timing pulses for the application of a control signal to the influencing means when the corresponding selected article advances past said station; varying the speed at which the articles advance along said path; and selecting different pulses of said series of pulses for the application of a control signal at different speeds of advancement of articles along said path.

14. The method of claim 13, wherein said last mentioned step includes selecting an earlier generated pulse of said series of pulses when said speed increases and vice versa.

15. Apparatus for regulating the timing of action upon articles which form part of, constitute or contain smokers' products, comprising means for advancing a succession of articles in a making and/or processing machine along a predetermined path consisting of successive sections each bounded by a pair of neighboring articles; signal-responsive article influencing means adjacent to one of said sections; means for generating control signals for at least some selected articles of said succession while such articles advance along a portion of said path ahead of said influencing means; means for generating a series of timing pulses during each interval of advancement of a selected article along a given section following the advancement of such selected article to a predetermined position immediately ahead of said given section; selector means including means for applying said control signals to said influencing means in response to the generation of a selected one of said series of timing pulses while the respective selected article advances along said one section of said path; means for changing the speed of said advancing means; and means for adjusting said selector means in response to changes in the speed of said advancing means so as to effect the application of said control signals in response to different pulses of said series at different speeds of said advancing means.

16. The apparatus of claim 15, wherein said adjusting means includes means for effecting the application of said control signals in response to an earlier generated pulse of said series when the speed of said advancing means increases and vice versa.

17. A method of regulating the timing of action upon articles which form part of, constitute or contain smokers' products and are advanced seriatim in a making and/or processing machine along a predetermined path consisting of successive sections, each bounded by a pair of neighboring articles, and extending past a station at which at least some selected articles of said succession are subjected to the action of signal-responsive influencing means, comprising the steps of generating a succession of control signals, one for each of said selected articles, before the respective selected articles reach said station; generating a series of timing pulses during the interval of advancement of a selected article along a given section of said path following the advancement of such article to a predetermined position immediately ahead of said given section; utilizing a selected one of said series of timing pulses for the application of a control signal to the influencing means when the corresponding selected article advances past said station; utilizing another pulse of said series for termination of the application of the corresponding control signal to the influencing means; varying the speed at which the articles advance along said path; and selecting different additional pulses of said series for termination of the application of the corresponding control signal at different speeds of advancement of articles along said path.

18. Apparatus for regulating the timing of action upon articles which form part of, constitute or contain smokers' products, comprising means for advancing a succession of articles in a making and/or processing machine along a predetermined path consisting of successive sections each bounded by a pair of neighboring articles; signal-responsive article influencing means adjacent to one of said sections; means for generating control signals for at least some selected articles of said succession while such articles advance along a portion of said path ahead of said influencing means; means for generating a series of timing pulses during each interval of advancement of a selected article along a given section following the advancement of such selected article to a predetermined position immediately ahead of said given section; and selector means including means for applying said control signals to said influencing means in response to the generation of a selected one of said series of timing pulses while the respective selected article advances along said one section of said path, said selector means further including means for terminating the application of control signals to said influencing means in response to the generation of another one of said series of timing pulses.

19. Apparatus for regulating the timing of action upon articles which form part of, constitute or contain smokers' products, comprising means for advancing a succession of articles in a making and/or processing machine along a predetermined path consisting of successive sections each bounded by a pair of neighboring articles; signal-responsive article influencing means adjacent to one of said sections; means for generating control signals for at least some selected articles of said succession while such articles advance along a portion of said path ahead of said influencing means; means for generating a series of timing pulses during each interval of advancement of a selected article along a given section following the advancement of such selected article to a predetermined position immediately ahead of said given section; selector means including means for applying said control signals to said influencing means in response to the generation of a selected one of said series of timing pulses while the respective selected article advances along said one section of said path, said selector means further including means for terminating the application of said control signals in response to the generation of a second selected pulse of said series; means for changing the speed of said advancing means; and means for adjusting said selector means in response to changes in the speed of said advancing means so as to effect the termination of the application of said control signals in response to different second selected pulses at different speeds of said advancing means.

* * * * *